US008856853B2

(12) United States Patent
Casagrande et al.

(10) Patent No.: US 8,856,853 B2
(45) Date of Patent: Oct. 7, 2014

(54) NETWORK MEDIA DEVICE WITH CODE RECOGNITION (75) Inventors: Steven Michael Casagrande, Castle Rock, CO (US); William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 447 days.

(21) Appl. No.: 12/981,244

(22) Filed: Dec. 29, 2010

(65) Prior Publication Data

US 2012/0169928 A1 Jul. 5, 2012

(51) Int. Cl.
*H04N 7/16* (2011.01)
(52) U.S. Cl.
USPC ........... 725/131; 725/100; 725/110; 725/112; 725/114; 725/139; 725/151
(58) Field of Classification Search
USPC .......... 725/100, 110, 112, 114, 131, 139, 151
See application file for complete search history.

(56) References Cited

U.S. PATENT DOCUMENTS

| | | | |
|---|---|---|---|
| 4,809,325 A | 2/1989 | Hayashi et al. | |
| 4,837,414 A | 6/1989 | Edamula | |
| 5,510,603 A | 4/1996 | Hess et al. | |
| 5,581,636 A | 12/1996 | Skinger | |
| 5,602,377 A | 2/1997 | Beller et al. | |
| 5,703,349 A | 12/1997 | Meyerson et al. | |
| 5,959,285 A | 9/1999 | Schuessler | |
| 5,978,855 A | 11/1999 | Metz et al. | |
| 6,006,990 A | 12/1999 | Ye et al. | |
| 6,058,238 A | 5/2000 | Ng | |
| 6,438,751 B1 | 8/2002 | Voyticky et al. | |
| 6,512,919 B2 | 1/2003 | Ogasawara | |
| 6,556,273 B1 | 4/2003 | Wheeler et al. | |
| 6,704,929 B1 | 3/2004 | Ozer et al. | |
| 6,983,304 B2 | 1/2006 | Sato | |
| 7,046,161 B2 | 5/2006 | Hayes | |
| 7,206,029 B2 | 4/2007 | Cohen-Solal | |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

International Search Report and Written Opinion of PCT/US11/59977 mailed on Mar. 19, 2012, 7 pages.

(Continued)

*Primary Examiner* — Mulugeta Mengesha
(74) *Attorney, Agent, or Firm* — Kilpatrick Townsend & Stockton LLP (57) ABSTRACT

One embodiment may take the form of a network media device including a processing unit configured to execute instructions stored on one or more storage media, and a first communication component coupled to the processing unit and configured to receive a video signal over an audio/video interface from a broadcast receiver. The video signal may include an image code including identifying information regarding the broadcast receiver. The processing unit may be configured to process the image code to extract the identifying information. A second communication component may be coupled to the processing unit and configured to transmit control signals based on the identifying information of the broadcast receiver.

11 Claims, 6 Drawing Sheets (56) References Cited

U.S. PATENT DOCUMENTS

| | | |
|---|---|---|
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 * | 11/2009 | Dua ............................ 725/114 |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 2001/0037297 A1 | 11/2001 | McNair |
| 2001/0052133 A1* | 12/2001 | Pack et al. .................... 725/109 |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0059339 A1 | 3/2005 | Honda et al. |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1* | 6/2007 | Abernethy et al. ............. 725/35 |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1* | 4/2008 | Gaos et al. .................... 709/238 |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Kindberg |
| 2009/0031071 A1 | 1/2009 | Chiu |
| 2009/0031373 A1* | 1/2009 | Hogyoku .................... 725/104 |
| 2009/0083808 A1 | 3/2009 | Morrison |
| 2009/0088213 A1 | 4/2009 | Rofougaran |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1* | 6/2009 | Nagamoto et al. ............... 705/27 |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0030068 A1 | 2/2011 | Imai |
| 2011/0039573 A1 | 2/2011 | Hardie |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |

(56) References Cited

U.S. PATENT DOCUMENTS

| | | |
|---|---|---|
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2013/0068838 A1 | 3/2013 | Gomez et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2010/149161 A1 | 12/2010 |
| WO | 2011/009055 A2 | 1/2011 |
| WO | 01/58146 A2 | 8/2011 |

OTHER PUBLICATIONS

International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.
Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Nghee, Seah Y., "Data Transmission Between PDA and PC Using Wifi for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

(56) References Cited

OTHER PUBLICATIONS

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
U.S. Appl. No. 12/964,478, filed Dec. 9, 2010, Non-Final Office Action mailed Mar. 26, 2013, 19 pages.
U.S. Appl. No. 12/961,369, filed Dec. 6, 2010, Non-Final Office Action mailed Mar. 25, 2013, 17 pages.
U.S. Appl. No. 12/953,227, filed Nov. 23, 2010, Final Office Action mailed May 24, 2013, 17 pages.
U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
Liu, Yue et al., "Recognition of QR code with mobile phones, " Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 13/016,483, filed Jan. 28, 2011 Final Office Action mailed Jun. 27, 2013, 13 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/037,316, filed Feb. 28, 2011, Final Office Action mailed Aug. 28, 2013, 13 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Final Office Action mailed Sep. 9, 2013, 10 pages.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
Extended European Search Report for EP 12152690.9 dated Jun. 19, 2012, 9 pages.
International Search Report and Written Opinion of PCT/US2012/026624 mailed Aug. 29, 2012. 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No, 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 13/037,312, filed Feb. 28, 2011, Office Action mailed Aug. 15, 2012, 9 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/984,385, filed Jan. 4, 2011, Notice of Allowance mailed Nov. 28, 2012, 11 pages.

(56) References Cited

OTHER PUBLICATIONS

U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 12/960,285, filed Dec. 3, 2010, Non-Final Office Action mailed Dec. 6, 2012, 17 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.

* cited by examiner

NETWORK MEDIA DEVICE WITH CODE RECOGNITION

FIELD OF THE INVENTION

Embodiments described herein relate generally to code recognition and, in particular, to network media devices capable of code recognition.

SUMMARY

The present disclosure discusses systems and methods utilizing code recognition in conjunction with network media devices. One embodiment may take the form of a network media device including a processing unit configured to execute instructions stored on one or more storage media, and a first communication component coupled to the processing unit and configured to receive a video signal over an audio/video interface from a broadcast receiver. The video signal may include an image code including identifying information regarding the broadcast receiver. The processing unit may be configured to process the image code to extract the identifying information. A second communication component may be coupled to the processing unit and configured to transmit control signals based on the identifying information of the broadcast receiver.

In another embodiment, the control signal may be transmitted to the broadcast receiver. In a further embodiment, the control signal includes a search command. In another embodiment, the video signal may include programming content received by the broadcast receiver from a programming transmitter. In a further embodiment, the broadcast receiver may be configured to generate the code. In another embodiment, the image code includes a quick response (QR) code. In another embodiment, the image code includes a barcode. In one embodiment, the network media device may further include a display device configured to display the code.

Another embodiment may take the form of a method executed by a processing device of a network media device for associating a broadcast receiver with the network media device. The method may include receiving an image code through an audio/video interface of the network media device, processing the image code to extract identifying information corresponding to the broadcast receiver, and transmitting a control signal from the network media device to the broadcast receiver.

In another embodiment, the image code may be embedded in a video signal carrying programming content. In a further embodiment, the image code may be generated by the broadcast receiver. In a further embodiment, the control signal is transmitted over an Internet interface. In another embodiment, receiving the image code through an audio/video interface may further include receiving the image code from the broadcast receiver.

Another embodiment may take the form of a method executed by a processing device of a network media device for processing a code. The method may include receiving a video stream from a broadcast receiver, receiving a first code in at least one frame of video of the video stream, scanning the first code in the at least one frame of video to identify supplemental content for display in association with the video stream, accessing the supplemental content, and overlaying the supplemental content on the video stream.

In another embodiment, the method may further include transmitting the video stream with the display data to a content display device. In a further embodiment, the first code identifies at least one of an address and a uniform resource location (URL) associated with the supplemental content and accessing the supplemental content includes accessing the address or the URL to obtain metadata corresponding to the supplemental content. In one embodiment, the supplemental content corresponds to an advertisement. In another embodiment, the supplemental content corresponds to news information. In a further embodiment, accessing the supplemental content may include storing user data and generating a second code based on the user data. In another embodiment, overlaying the supplemental content further includes overlaying the second code over the first code in the at least one frame of the video stream.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Network media devices, which are devices configured both to receive programming content from a broadcast receiver and to connect to the Internet, are becoming increasingly popular in home entertainment systems. Such devices may be connected between a broadcast device and a content display device, and typically include a network connection. For example, network media devices may interface with the broadcast receiver to manipulate content transmitted by the broadcast receiver, as well as allow users to access, download, and run applications either pre-loaded into the network media device or from the Internet. Additionally, some network media devices may allow users to search for content on the Internet and/or in the programming content supplied from the broadcast receiver.

The present disclosure discloses systems and methods utilizing code recognition in conjunction with network media devices. One embodiment of a system may include a network media device that is connected to a content display device and a broadcast receiver. The broadcast receiver may be configured to transmit one or more codes to a network media device, which may scan and process the codes to associate itself with a broadcast receiver. In other embodiments, the network media device may process the codes to obtain an address or a URL that may be accessed by the network media device, for example, over an Internet connection. The content stored at the address or the URL may then be displayed to a user on a content display device coupled to the network media device.

Figure 1:
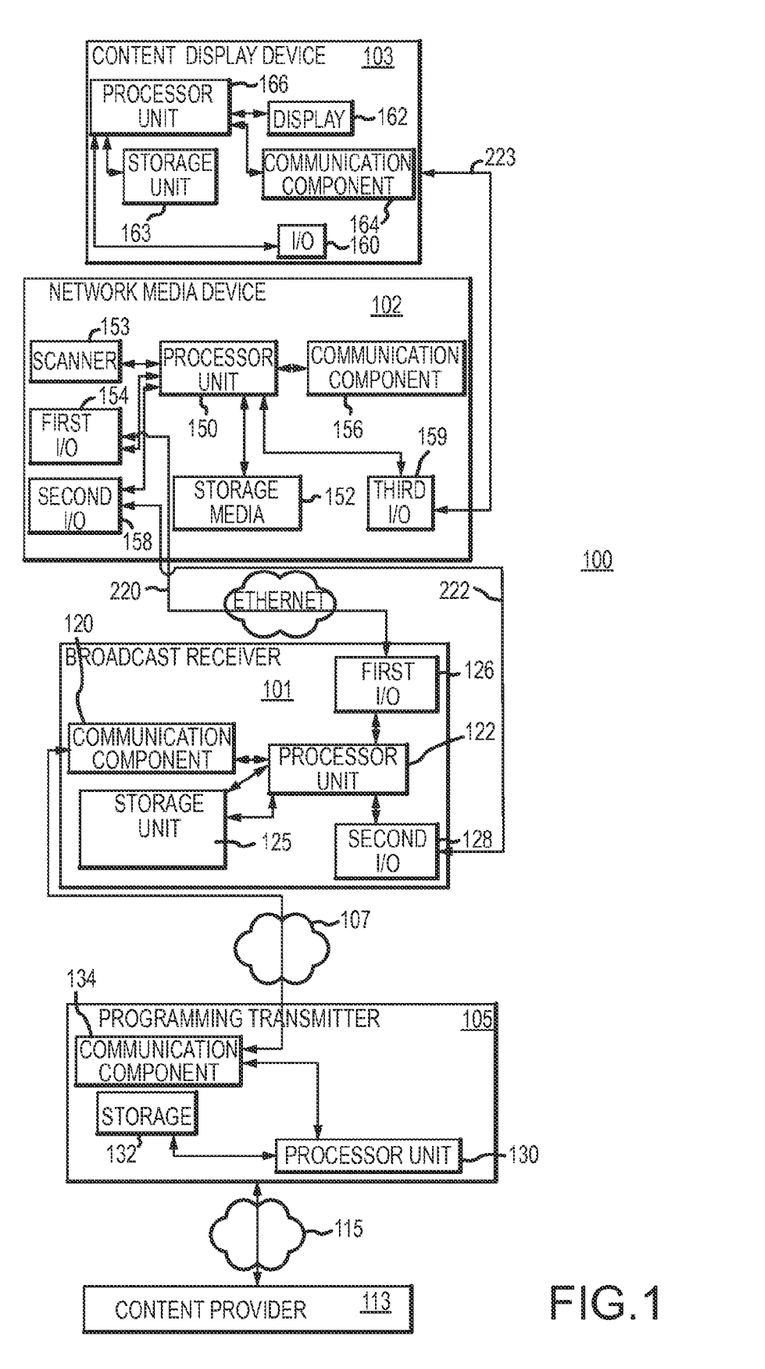
FIG. 1 is a block diagram illustrating a system incorporating a network media device.

FIG. 1 is a block diagram illustrating a system 100 implementing a network media device 102. As shown in FIG. 1, the system may include a network media device 102, a broadcast receiver 101, which, in one embodiment, may be a set-top box, communicatively coupled to the network media device 102, a content display device 103, which, in one embodiment, may be a display device, communicatively coupled to the network media device 102, and a programming transmitter 105, which, in one embodiment, may be a satellite television or a cable television provider, communicatively coupled to the broadcast receiver 101 via one or more transmission media 107. In some embodiments, the system may further include a content provider 113 that is communicatively coupled to the programming transmitter 105 via one or more transmission media 115. "One or more transmission media," as defined herein, may include any kind of wired or wireless transmission media such as a satellite connection, an Internet connection, a cellular connection, a local area network connection, and so on.

The network media device 102 may include one or more processing units 150, one or more storage media 152, a first input/output component 154 configured to receive and/or transmit control signals to the broadcast receiver 101 over a first interface 220, a second input/output component 158 configured to receive and/or transmit audio/video signals to the broadcast receiver 101 over a second interface 222, as well as a third input/output component 159 configured to receive and/or transmit audio/video signals to the broadcast receiver 101 over a third interface 223. In one embodiment, such as that shown in FIG. 1, the first interface 220 may be an Ethernet connection, while the second interface 222 may be a high-definition multimedia interface (HDMI). The second interface 222 may also be another type of audio/video interface, such as Digital Visual Interface, an YPbPr interface, a Red-Green-Blue composite interface, modulated radio frequency, HDbaseT, and so on. The network media device 102 may further include one or more communication components 156 configured to allow the network media device 102 to connect to the Internet over a wired or a wireless connection. As will be further discussed, the one or more processing units 150 of the network media device 102 (or alternatively, an optional additional scanner 153) may be configured to read a code containing image data. The image data may be analyzed by at least one of the one or more processing units 150, which may include decoder circuitry configured to process image data. "Storage media," as defined herein, may be any non-transitory machine-readable storage medium, including, but not limited to, magnetic storage, optical storage, disk storage, flash memory, memory cards, and so on.

The broadcast receiver 101 may include one or more processing units 122, one or more storage media 124, one or more communication components 120 configured to allow the broadcast receiver 101 to transmit and/or receive programming content signals from the programming transmitter 105, a first input/output component 128 configured to allow the broadcast receiver 101 to transmit and/or receive audio-video signals from the network media device 102, and a second input/output component interface 126, which may be configured to receive control signals from the network media device 102.

The content display device 103 (such as a television, laptop computing device, a tablet computer device, a cellular telephone, and so on) may include a first input/output component 160 to transmit and/or receive signals from the network media device 102. In some embodiments, the content display device 103 may also include a second input/output component to transmit and/or receive signals from the broadcast receiver 101. Additionally, the content display device 103 may include one or more storage media 163, one or more processing units 166, and one or more display devices 162 configured to display the signals from the network media device 102 and/or the broadcast receiver 101. The content display device 103 may further include a communication component 164 that is configured to receive audio/video signals over a third interface 223 from the third input/output component 159 of the network media device 102. In one embodiment, the third interface 223 may be an audio/video interface such as an HDMI interface. The processor unit 166 of the content display device 103 may also be configured to selectively display content received from the network media device 102 or the broadcast receiver 101.

The programming transmitter 105 may include one or more processing units 130, and one or more communication components 134 configured to allow the programming transmitter 105 to transmit and/or receive signals from the broadcast receiver 101 and/or the content provider 113 via one or more transmission media 107, 115. The signals may include, but are not limited to, programming content, programming information, for example, in the form of an electronic program guide, applications, audio files, images, and so and so forth.

In one embodiment, the storage medium 152 of the network media device 102 may store software, such as operating system software, that may be executed by the one or more processing units 150 to allow a user to interface with the network media device. For example, the processing units 150 may execute the operating system software to provide a graphical user interface, allow users to search the Internet and/or programming content received by the broadcast receiver 101, download applications, and so on. In some embodiments, this may be accomplished using a search bar. For example, the operating system software may allow a user to search and find videos, photos, and/or other content on the Internet or in the programming content being broadcast by the broadcast receiver 101. The operating system software may further allow a user to search content stored locally in the storage media 152 of the network media device 102. The one or more processing units 150 may further execute instructions in the storage medium 152 in order to transmit programming content from the broadcast receiver 101 to a content display device 103. As will be further described below, the programming content may, in one embodiment, be altered by the network media device 102 prior to transmission to the content display device 103, for example, by overlaying video or images, or may be transmitted to the content display device 103 in an unaltered format. For purposes of illustration only, the network media device 102 may be a Google TV™ box, as co-developed by Google Inc., Intel Corporation, Sony Corporation, and Logitech International S.A. Other embodiments may use other types of network media devices.

The broadcast receiver 101 may be any kind of controllable electronic device, such as a set top box, a cable box, a television receiver, a digital video recorder, a cellular telephone, a laptop computer, a desktop computer, a mobile computer, and so on. The broadcast receiver 101 may be operable to receive programming content from one or more programming transmitters 105 via one or more transmission media 107. The processing unit 122 of the broadcast receiver 101 may execute instructions stored in the storage medium 124 in order to store the received programming content in the storage medium, process the received programming content for transmission to the network media device 102, and so on. Additionally, the broadcast receiver 101 may further execute instructions stored in the storage medium 124 in order to process and execute command signals received from the remote control device 102. As alluded to above, the broadcast receiver 101 may further be configured to receive command signals, which may include search commands, from the network media device 102 and transmit the search results to the network media device 102.

The programming transmitter 105, which may be one or more satellite television providers, cable television providers, Internet service providers, video on demand providers, and so on, may be operable to receive programming content from one or more content providers 113 via one or more transmission media 115. The processing unit 130 of the programming transmitter 105 may execute instructions stored in the storage medium 132 in order to transmit the programming content to the broadcast receiver 101.

The content display device 103 may be any kind of device configured to process and output content received from the network media device 102. For example, the content display device 103 may be a television, a radio, a monitor, a cellular telephone, a speaker, a computer, and so on. The processing unit 166 of the content display device 103 may execute instructions stored in the storage medium 163 in order to display programming content received from either the broadcast receiver 101 or from the network media device 102 (which may serve as an intermediary device between the broadcast receiver 101 and the network media device 102). Additionally, the content display device 103 may further execute instructions stored in the storage medium 163 in order to process and execute command signals received from a remote control device.

In some embodiments, one or more of the components of the content display device 103 and the network media device 102 may be incorporated into a single device. For example, in one embodiment, the network media device 102 may incorporate a display device configured to display content. Additionally, in other embodiments, the components of the network media device 102 and the broadcast receiver 101 may incorporated into the same device.

a. Associating a Broadcast Receiver with a Network Media Device

Existing broadcast receivers may not be able to determine which network media device 102 may be associated with a particular broadcast receiver 101. This may be problematic, for example, where users may have multiple network media devices and/or broadcast receivers, or where a single network media device is connected to multiple broadcast receivers. As discussed above, the first or Internet interface 220 between the network media device 102 and the broadcast receiver 101 for carrying control signals between the devices may not be a point-to-point interface. Instead, the signals may be transmitted through a network prior to transmission to the other device. Accordingly, the Internet interface 220 may not allow for convenient transmission of identifying information between the devices. In contrast, the second or video interface 220 between the network is a point-to-point interface, and may serve as a better interface for transmitting identifying information.

In one embodiment, the broadcast receiver 101 may execute instructions stored in the storage medium to transmit a code containing encoded information to the network media device 102. In one embodiment, the code may be a two-dimensional code or a matrix code, such as a QR code, but may take other forms in other embodiments. For example, the code may be a barcode, such as a barcode, and/or multiple two-dimensional or one-dimensional codes that are flashed simultaneously or in a short period of time. The encoded information may be alpha-numeric text, a Uniform Resource Locator (URL), contact information, a request for data, such as viewer preferences, or other data, and may be readable by the processing unit 150, of the network media device 102. In some embodiments, the encoded information may be raw data, as opposed to alpha-numeric text.

In some embodiments, the code may contain identifying information that is somewhat unique to the broadcast receiver 101. For example, the identifying information may be the MAC address, receiver identification number, Smartcard identification number, IP address of the broadcast receiver 101, or other identifying information. The code can be embedded in the video from the content provider 113, or can be generated by the broadcast receiver 102.

In one embodiment, the broadcast receiver 101 may transmit the code to the network media device 102 over the HDMI interface between the broadcast receiver 101 and the network media device 102. However, in other embodiments, the broadcast receiver may transmit the code over a different type of audio/video interface. The code may be generated by the processing device of the broadcast receiver 101, transmitted in a video stream from the programming transmitter 105, or may be pre-loaded onto the one or more storage media of the broadcast receiver 101 before it is distributed to the user.

The network media device 102 may recognize, scan, and decode the code received from the broadcast receiver 101 to obtain the identifying information for the broadcast receiver 101. These operations may be facilitated by software stored on the storage medium 154, firmware, and the like. Since the identifying information in the code may be unique or semi-unique to the broadcast receiver 101, this may allow the network media device 102 to determine which broadcast receiver 101 is connected to the network media device 102, as well as for distinguishing the broadcast receiver 101 from other broadcast receivers.

In some embodiments, the network media device 102 may store a database containing the identifying information for one or more broadcast receivers 101, and the network media device 102 may compare the identifying information received from the broadcast receiver 101 (i.e., in the code) to that contained in the database. If there is a match between the identifying information in the code and one of the entries of the database, the network media device 102 may allow for transmission of signals to the broadcast receiver 101. Alternatively, if there is no match, the network media device 102 may not transmit signals to the broadcast receiver 101 that transmitted the code to the network media device 102. The entries in the database may be manually populated by a user, or may be automatically updated as different broadcast receivers 101 are connected to the network media device 102. In other embodiments, authentication of a broadcast receiver 102 may be otherwise accomplished, such as using a cryptographic authentication.

b. Accessing and Processing Codes with a Network Media Device

Existing code processing systems often rely on user action for accessing information, which can be a URL or an address, contained in the code. For example, many systems display the code to the user on a content display device. A user may then scan the code using a scanner device, such as a camera, to access the information stored in the code. Such systems can be tedious for users, and further require that the user possess a scanner. Accordingly, a system that can automatically access the content at the address or the URL of a code and display the content to the user is be desirable.

In one embodiment, the broadcast receiver 101 may transmit a code containing instructions or data, such as an address or a URL to the network media device 102. The network media device 102 may execute instructions in order to then decode the code and process it accordingly. For example, the media device may access the address or the URL over an Internet or other connection, retrieve content therefrom, and display the content from the accessed address or URL on the content display device. In some embodiments, the address may correspond to a memory location in the storage media 152 of the network media device 102.

As discussed above, the code may be generated by the broadcast receiver 101 or may be embedded in or associated with a video signal received from the programming transmitter 105. In one embodiment, the code may be inserted into one or more frames of the video signal by the broadcast receiver 101, the programming transmitter 105, or the content provider 113. In some embodiments, the video signal containing the code may be transmitted by the programming transmitter 105 to the broadcast receiver 101, and then transmitted by the broadcast receiver 101 to the network media device 102 over the HDMI or other audio/video connection. Upon receiving the video signal from the broadcast receiver 101, the network media device 102 may execute instructions to display the video signal on the content display device 103. In such embodiments, the code may be briefly displayed or "flashed" by the content display device 103 so as to be imperceptible by a user viewing the video signal. The length of time the code is "flashed" may vary according to different embodiments. For example, the length of time may be a fraction of a second so that the user cannot perceive the code, a second, several seconds, and so on. Upon detecting the code in the video stream from the broadcast receiver 101, the network media device 102 may intercept the code from the video stream and automatically execute instructions to access the address or URL in the code and display the content at the address or URL to the user on the content display device 103. In other embodiments, the code may be otherwise inserted into the video signal. For example, the code may be graphically overlaid onto one or more frames of the video signal.

In one embodiment, the network media device 102 may graphically overlay the content at the address or URL over one or more frames of the video signal and transmit the video signal, with the overlaid content, to the content display device 103 for display. In some embodiments, the code itself may contain metadata, trailers, or other information corresponding to the display parameters for the content. For example, the metadata may include the size of the overlaid content, the location of the overlaid content on the screen, the amount of time for which the overlaid content is displayed to the user, and so on. In other embodiments, the address or URL may link to the metadata for the content, which may be on a web server.

The embodiments described above therefore allow for automatic access and processing of the content in a code by the network media device 102. As alluded to above, such embodiments reduce the need for an additional code scanner, as well as the amount of effort required for scanning and accessing the content associated with the code on the part of the user. Accordingly, the user interaction typically required for scanning and processing codes is bypassed.

In another embodiment, the network media device 102 may be configured to generate a second code based on the code received from the broadcast receiver 101. For example, the network media device 102 may scan and process the code from the broadcast receiver 101 as described above, generate a second code, and overlay the second code onto the video stream from the broadcast receiver 101. The second code may then be scanned by the user, for example, using a phone or other scanner, to access a URL or address encoded in the code, or may be automatically scanned and processed by the network media device 102 in a fashion similar to that described above. The second code may be generated based on various user-preferences or other user data. For example, the network media device 102 may prompt the user to answer various questions about the user, such as the user's interests, age, geographical location, income, and so on, and store the user's answers in the storage medium. In other embodiments, the network media device 102 may receive user-preference information from the broadcast receiver. The second code may be generated by code generation software stored in the storage medium. For example, in one embodiment, the network media device 102 may process the first code received from the broadcast receiver 101 to extract the URL or address associated with the first code, and the code generation software may modify the URL or address to include the user data. The code generation software may then generate the second code based on the modified URL or address.

In another embodiment, the broadcast receiver 101 may transmit an address or URL linking to programming content corresponding to the location of the user. This may be used, for example, to display content, such as advertising, videos, applications, and other media, based on the location of the user. For example, the one or more storage media of the broadcast receiver 101 may store the zip code of the location of the broadcast receiver 101, and execute instructions to generate an address or URL incorporating the zip code. In other embodiments, the broadcast receiver 101 may include or be associated with a Global Positioning System (GPS) configured to derive the location of the broadcast receiver 101.

In other embodiments, the one or more storage media of the network media device 102 may store the zip code of the location of the network media device 102, and may transmit its zip code to the broadcast receiver 101, which may execute instructions to generate an address or URL incorporating the zip code. In a further embodiment, the one or more storage media 154 of the network media device 102 may store the zip code of the location of the network media device, and the network media device 102 may execute instructions to generate an address or URL incorporating the zip code. In another embodiment, the one or more storage media 154 of the network media device 102 may store a country code or other designation of the location of the network media device.

In one embodiment, the address or URL may link to custom content generated based on the location of the network media device 102. The custom content may include, for example, an advertisement that includes prices in the currency used in the location of the network media device 102. For example, if a network media device 102 is located in the United States, the advertisement may display prices in dollars, and if the network media device 102 is located in France, the advertisement may display prices in Euros. Similarly, the advertisement may display different prices depending on the location of the network media device 102. For example, the network media device 102 may display higher or lower prices in the same currency, depending on the location of the network media device 102, e.g., to reflect a higher or lower cost of living area. In further embodiments, the custom content may be in a particular language based on the location of the network media device 102. For example, the custom content may be in English is the network media device 102 is located in the United States, and in Spanish if the network media device 102 is located in Mexico. In another embodiment, the custom content may be in a language preferred by the user. For example, the language may be selected by the user through a user interface, preprogrammed into the network media device 102, based on the location of the network media device 102, and so on and so forth.

Figure 2:
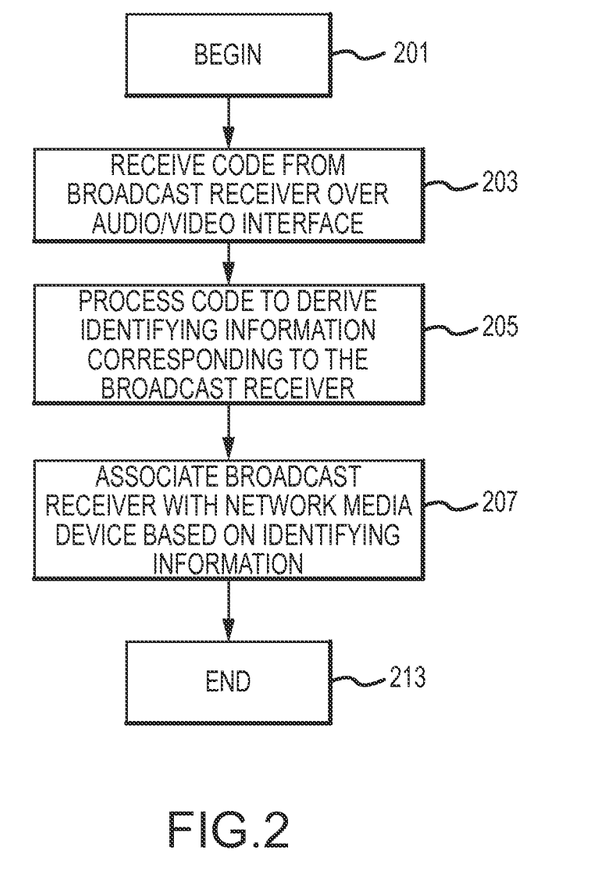
FIG. 2 is a flow chart illustrating one embodiment of a method for associating a network media device with a broadcast receiver. This method may be performed by the system of FIG. 1.

FIG. 2 illustrates one embodiment of a method 200 for pairing a network media device to a broadcast receiver. The method 200 may be performed by the network media device 102 of FIG. 1. The flow begins at block 201 and proceeds to block 203, where the broadcast receiver 101 transmits a code that is received by a network media device 102 over an audio/video interface. In one embodiment, the code may be a two-dimensional code, such as a QR code. Other embodiments may utilize other types of codes. The audio/video interface may be an HDMI interface, or some other type of audio/video interface.

The flow then proceeds to block 205, where the network media device 102 may process the code to derive identifying information corresponding to the broadcast receiver 102. As discussed above, the identifying information may include the IP address of the broadcast receiver, the MAC address, the Receiver ID, and so on and so forth. The flow then proceeds to block 207, where the network media device 102 may associate the broadcast receiver 102 with the network media device 102 based on the decoded identifying information. In other words, the network media device 102 may be configured to identify the particular broadcast receiver 102 that it is connected to based on the identifying information received in the code. In the operation of block 213, the method may conclude.

Figure 3:
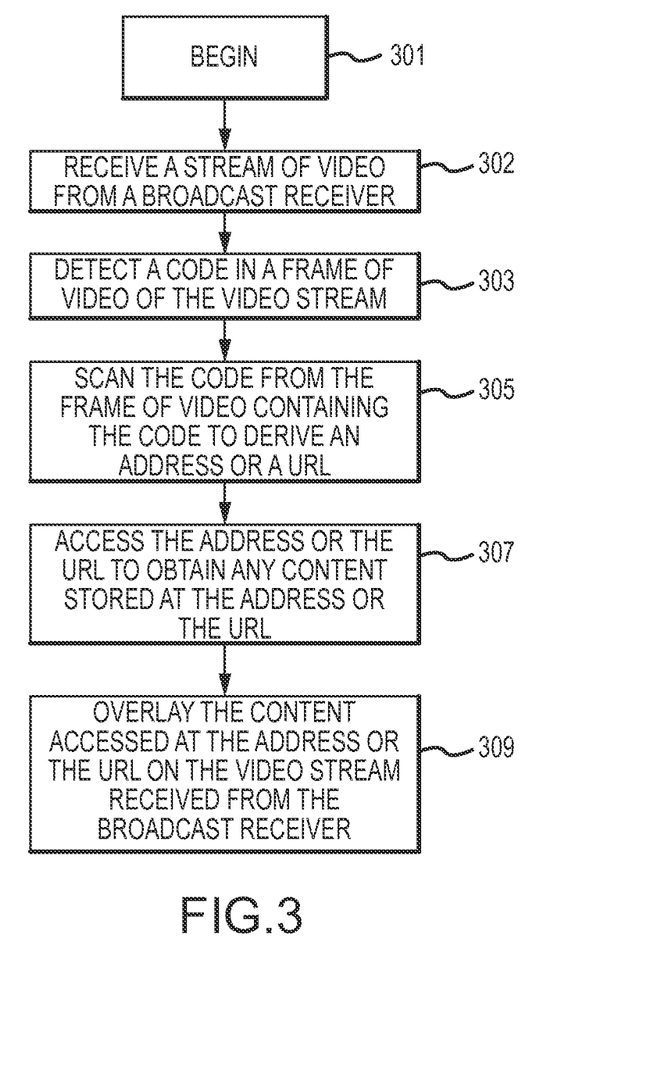
FIG. 3 is a flow chart illustrating one embodiment of a method for accessing and processing a code.

FIG. 3 illustrates one embodiment of a method 300 for accessing and processing a code. The method 300 may be performed by the network media device 102 of FIG. 1. The flow begins at block 301, and then proceeds to block 302, where the network media device 102 may receive a stream of video from a broadcast receiver 101. The flow may then proceed to block 303, where the network media device 102 may detect a code in a frame of video of the video stream. In one embodiment, the network media device 102 may process each frame of video in a video signal received from the broadcast receiver 101. The flow may then proceed to block 305, in which the network media device 102 may scan the code from the frame of video containing the code to derive an address or a URL. In one embodiment, this may be accomplished by downloading the code onto a storage medium of the network media device 102, and then decode the code using the scanner of the network media device 102. In other embodiments, the network media device 102 may not download the code, but may scan and process the code upon receiving the frame of video. In the operation of block 307, the network media device 102 may then access the address or the URL to obtain any content stored at the address or the URL. In the operation of block 309, the network media device 102 may then overlay the content accessed at the address or the URL on the video stream received from the broadcast receiver 101.

Figure 4:
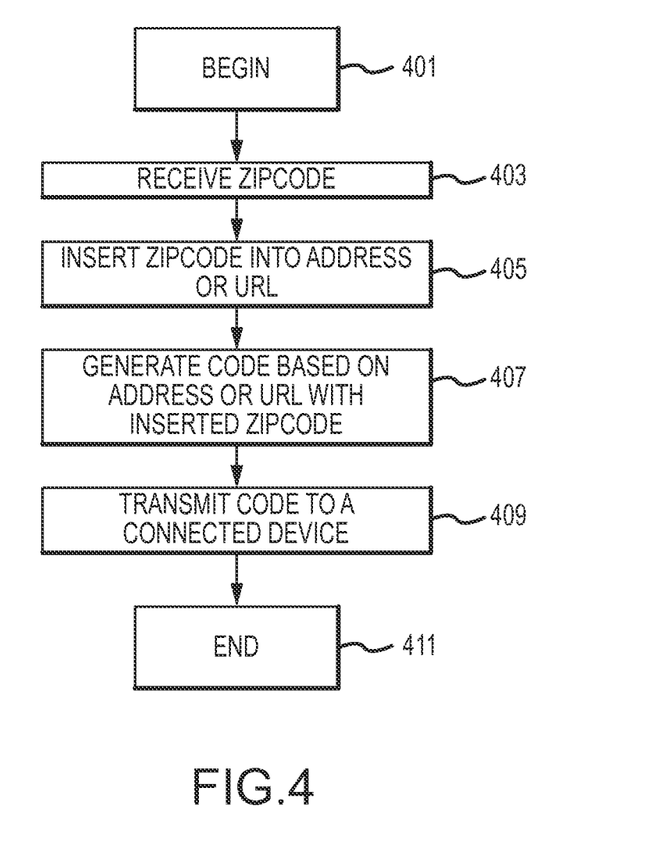
FIG. 4 is a flow chart illustrating one embodiment of a method for transmitting content based on a location of an electronic device.

FIG. 4 illustrates one embodiment of a method 400 for transmitting content based on a location of an electronic device. The method 400 may be performed by the broadcast receiver 101 or by the network media device 102 of FIG. 1. The flow begins at block 301 and proceeds to block 403, where the broadcast receiver 101 or the network media device 103 may receive a zip code. In one embodiment, the zip code may be downloaded or preprogrammed into the storage media of the broadcast receiver 101 or the network media device 102 prior to distribution of the user. In the operation of block 405, the broadcast receiver 101 or the network media device 102 may insert the zip code into the address or the URL. For example, the broadcast receiver 101 or the network media device 102 may execute instructions to cut and paste the zip code into the address or the URL. In the operation of block 407, the broadcast receiver 101 or the network media device 102 may generate a code based on the address or the URL with the inserted zip code 407. In the operation of block 409, the broadcast receiver 101 or the network media device 102 may transmit the code to a connected device. The method concludes in the operation of block 411.

Figure 5:
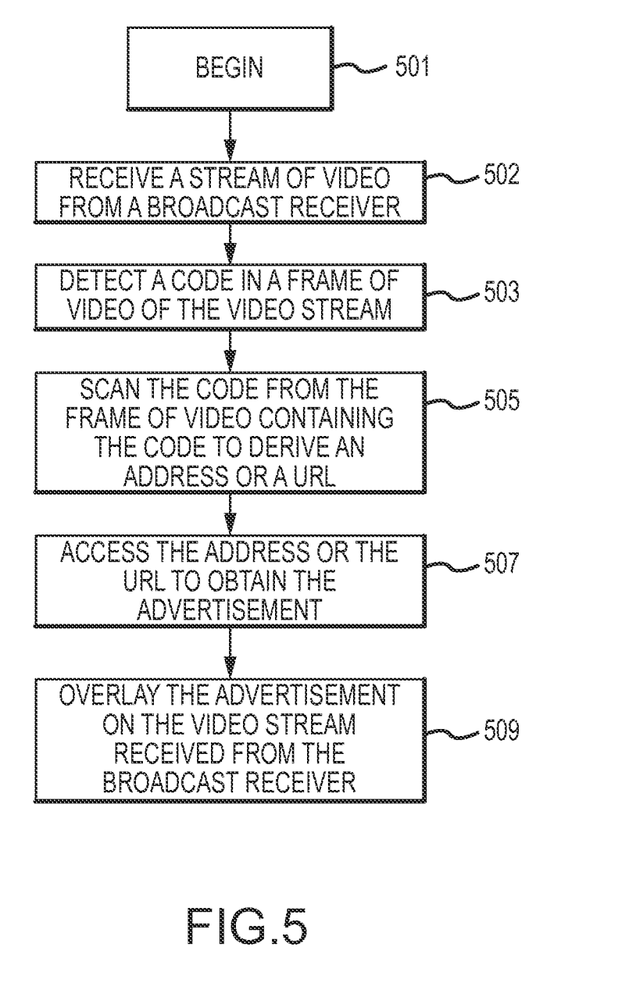
FIG. 5 is a flow chart illustrating one embodiment of a method for displaying advertisements in a video stream.

FIG. 5 illustrates one embodiment of a method 500 for displaying advertisements in a video stream. The method 500 may be performed by the network media device 102 of FIG. 1. The flow begins at block 501, and then proceeds to block 502, where the network media device 102 may receive a stream of video from a broadcast receiver 101. The flow may then proceed to block 503, where the network media device 102 may detect a code in a frame of video of the video stream. As discussed above, the network media device 102 may process each frame of video in a video signal received from the broadcast receiver 101. The flow may then proceed to block 505, in which the network media device 102 may scan the code from the frame of video containing the code to derive an address or a URL. In the operation of block 507, the network media device 102 may then access the address or the URL to obtain the advertisement, which may be stored at the address or the URL. The address or URL may also store the metadata for displaying the advertisement. In the operation of block 509, the network media device 102 may then overlay the advertisement on the video stream received from the broadcast receiver 101.

Figure 6:
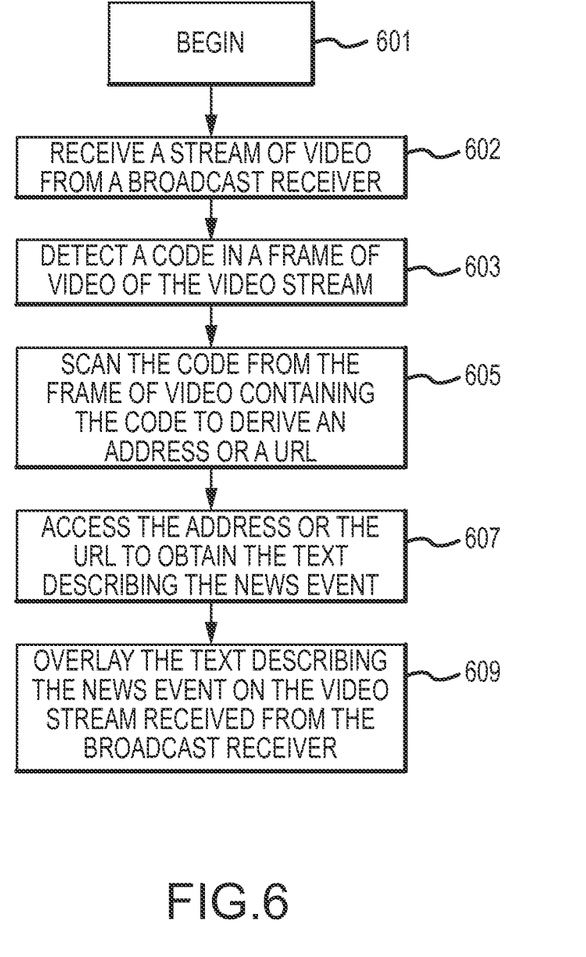
FIG. 6 is a flow chart illustrating one embodiment of a method for displaying current events information in a video stream.

FIG. 6 illustrates one embodiment of a method 600 for displaying current events information in a video stream. The current events may relate to various news, including local or national news, sports, weather, emergency news, and so on. The method 600 may be performed by the network media device 102 of FIG. 1. The flow begins at block 601, and then proceeds to block 602, where the network media device 102 may receive a stream of video from a broadcast receiver 101. The flow may then proceed to block 603, where the network media device 102 may detect a code in a frame of video of the video stream. As discussed above, the network media device 102 may process each frame of video in a video signal received from the broadcast receiver 101. The flow may then proceed to block 605, in which the network media device 102 may scan the code from the frame of video containing the code to derive an address or a URL. In the operation of block 607, the network media device 102 may then access the address or the URL to obtain the text describing the news event, which may be stored at the address or the URL. The address or URL may also store the metadata for displaying the news across the screen of the content display device. In the operation of block 609, the network media device 102 may then overlay the text describing the news event on the video stream received from the broadcast receiver 101.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A network media device, comprising:
    a processing unit configured to execute instructions stored on one or more storage media;
    a first communication component coupled to the processing unit and configured to receive a video signal over an audio/video interface from a broadcast receiver physically separate from the network media device, the video signal including an image code, the image code comprising identifying information regarding the broadcast receiver, the processing unit configured to process the image code to extract the identifying information; and
    a second communication component coupled to the processing unit and configured to transmit control signals to the broadcast receiver based on the identifying information of the broadcast receiver, wherein the control signal comprises at least a search command.

2. The network media device of claim 1, wherein the video signal comprises programming content received by the broadcast receiver from a programming transmitter.

3. The network media device of claim 1, wherein the broadcast receiver is configured to generate the code.

4. The network media device of claim 1, wherein the image code comprises a quick response (QR) code.

5. The network media device of claim 1, wherein the image code comprises a barcode.

6. The network media device of claim 1, further comprising:
    a display device configured to display the code.

7. A method executed by a processing device of a network media device for associating a broadcast receiver with the network media device, comprising:
    receiving an image code, through an audio/video interface of the network media device, from a source physically separate from the network media device;
    processing the image code to extract identifying information corresponding to the broadcast receiver; and
    transmitting a control signal from the network media device to the broadcast receiver, wherein the control signal comprises at least a search command.

8. The method of claim 7, wherein the image code is embedded in a video signal carrying programming content.

9. The method of claim 8, wherein the image code is generated by the broadcast receiver.

10. The method of claim 8, wherein the control signal is transmitted over an Internet interface.

11. The method of claim 10, wherein receiving the image code through an audio/video interface further comprises:
    receiving the image code from the broadcast receiver.

* * * * *